United States Patent
Eisentraut et al.

(10) Patent No.: US 8,056,853 B2
(45) Date of Patent: Nov. 15, 2011

(54) RECONFIGURABLE WING AND METHOD OF USE

(75) Inventors: Rudy A. Eisentraut, Tucson, AZ (US);
Terry M. Sanderson, Tucson, AZ (US);
Brian J. Gowler, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 485 days.

(21) Appl. No.: 12/277,345

(22) Filed: Nov. 25, 2008

(65) Prior Publication Data
US 2010/0127130 A1 May 27, 2010

(51) Int. Cl.
*B64C 3/38* (2006.01)
*B64C 3/56* (2006.01)
(52) U.S. Cl. .......... 244/46; 244/49; 244/123.1; 244/124
(58) Field of Classification Search ................ 244/45 R, 244/46, 49, 123.1, 124
See application file for complete search history.

(56) References Cited

U.S. PATENT DOCUMENTS

| | | |
|---|---|---|
| 2,559,827 A | 7/1951 | Northrup |
| 3,628,352 A | 12/1971 | Stuemky |
| 5,049,591 A | 9/1991 | Hayashi et al. |
| 5,082,207 A | 1/1992 | Tulinius |
| 5,181,678 A | 1/1993 | Widnall et al. |
| 6,010,098 A | 1/2000 | Campanile et al. |
| 6,264,136 B1 | 7/2001 | Weston |
| 6,705,568 B2 | 3/2004 | Lee |
| 6,834,835 B1 | 12/2004 | Knowles et al. |
| 7,066,428 B1 * | 6/2006 | Haggard et al. ............... 244/49 |
| 7,777,165 B2 | 8/2010 | Sanderson et al. |
| 2002/0195177 A1 | 12/2002 | Hinkley et al. |
| 2004/0086699 A1 | 5/2004 | Schneider |
| 2005/0206096 A1 | 9/2005 | Browne et al. |
| 2007/0107189 A1 | 5/2007 | Prichard et al. |
| 2008/0061192 A1 | 3/2008 | Sullivan |
| 2009/0072094 A1 | 3/2009 | Sanderson et al. |
| 2009/0206192 A1 | 8/2009 | Sanderson et al. |

(Continued)

FOREIGN PATENT DOCUMENTS

CN 101028866 A 9/2007

(Continued)

OTHER PUBLICATIONS

Shaw, John A. et al., "The Manufacture of Niti Foams", Proceedings of 2002 ASME International Mechanical Engineering Congress and Exposition, (2002), pp. 1-10.
Perkins, David A. et al., "Morphing Wing Structures for Loitering Air Vehicles", 45th AIAA/ASME/ASCE/AHS/ASC Structures, Structural Dynamics & Materials Conference, (2004), p. 1.

(Continued)

*Primary Examiner* — David H Bollinger
(74) *Attorney, Agent, or Firm* — Renner, Otto, Boisselle & Sklar, LLP

(57) ABSTRACT

A reconfigurable air vehicle wing may be selectively reconfigured to increase its chord. The wing has a leading edge portion and a trailing edge portion that are moved relative to one another to change the chord of the wing. The wing may be reconfigured from a compact configuration with a smaller chord, to and expanded configuration with a larger chord. The wing may include a foam material that forms part of the outer surface of the wing when the wing is in the expanded configuration. The foam may be a shape memory foam. Alternatively the leading edge section and the trailing edge section may be composed substantially fully of rigid materials. In either case the trailing edge section may be hingedly coupled to the leading edge section.

19 Claims, 8 Drawing Sheets

U.S. PATENT DOCUMENTS

| | | | |
|---|---|---|---|
| 2009/0283643 A1 | 11/2009 | Sar et al. | |
| 2009/0283936 A1 | 11/2009 | Sanderson et al. | |
| 2009/0286101 A1 | 11/2009 | Sar et al. | |
| 2009/0302151 A1* | 12/2009 | Holmes | 244/49 |
| 2010/0030308 A1 | 2/2010 | Anderson et al. | |
| 2010/0282917 A1 | 11/2010 | O'Shea | |

FOREIGN PATENT DOCUMENTS

| | | | |
|---|---|---|---|
| EP | 1607602 A2 | 12/2005 |
| GB | 2445099 A | 6/2008 |
| WO | 03068584 A1 | 8/2003 |
| WO | 2007001392 A2 | 1/2007 |

OTHER PUBLICATIONS

Application from related U.S. Appl. No. 12/616,812, filed Nov. 12, 2009.

Application from related U.S. Appl. No. 12/616,806, filed Nov. 12, 2009.

Sanderson, Terry, "Shape Memory Polymer Characterization for Advanced Air Vehicle Technologies", Raytheon Technology Today, (2007), vol. 2007, No. 4, [retrieved from internet] <www.raytheon.com/technology_today/archive/2007_issue 4.pdf>.

Thill C. et al., "Morphing Skins", Aeronautical Journal, (2008), vol. 112, No. 1129, [retrieved from internet], <www.aer.bris.ac.uk/research/fibres/morph%20pics/RoyAeroSocMorphSkin.pdf>.

* cited by examiner

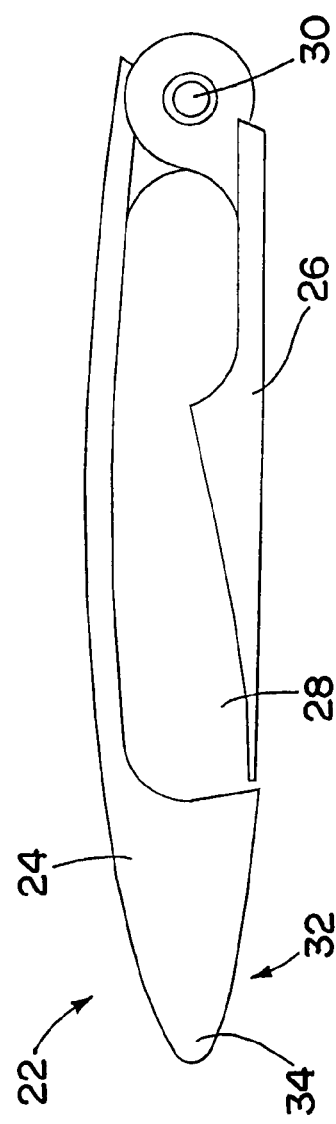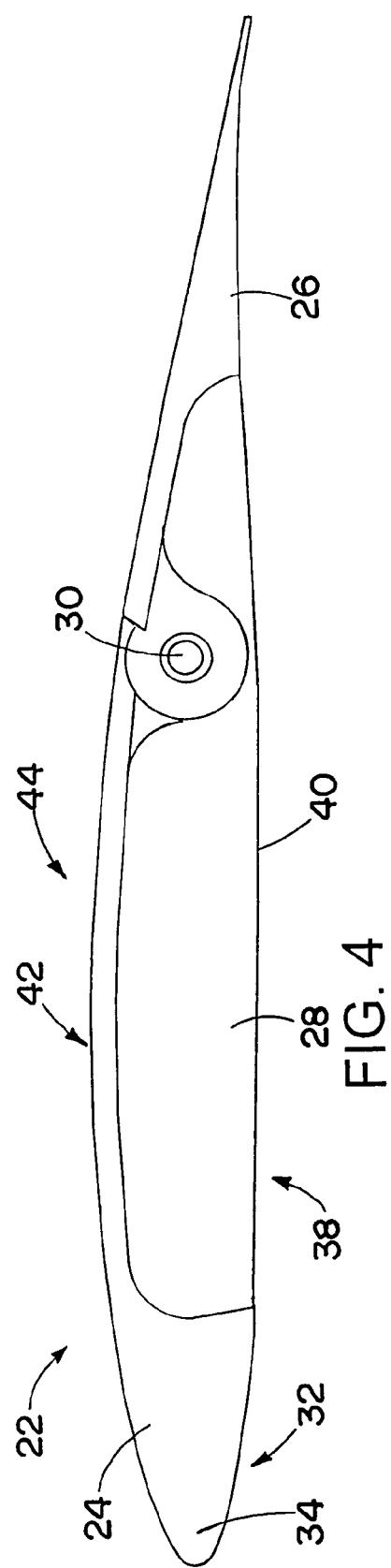

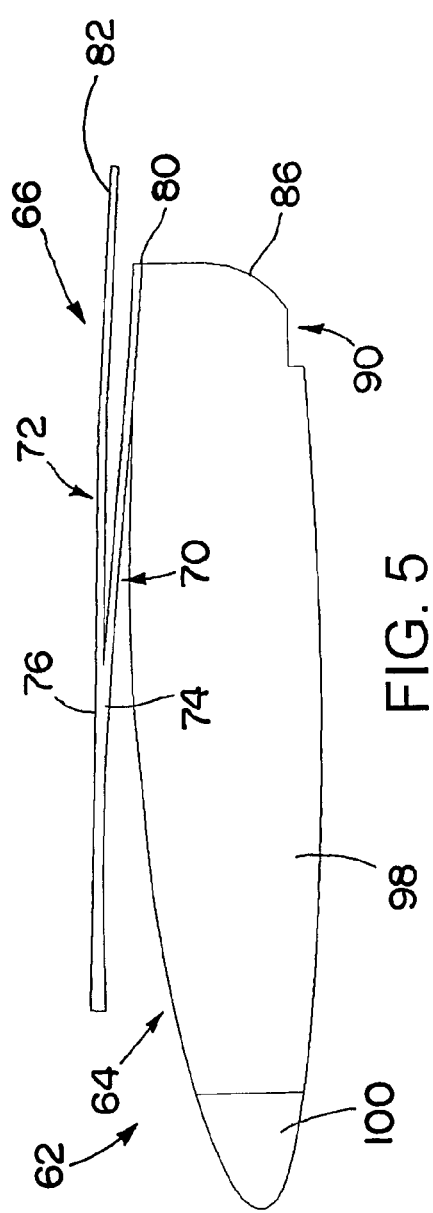
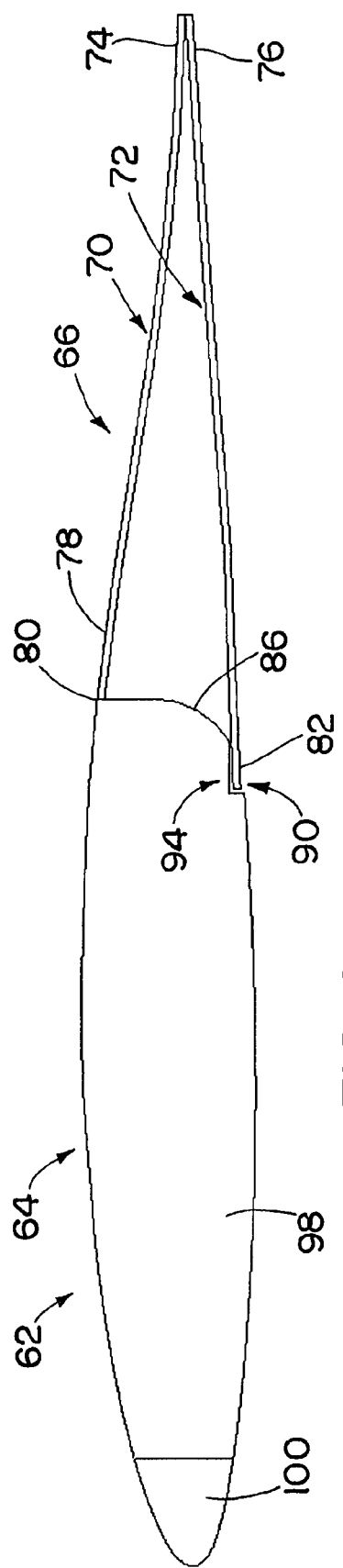
FIG. 5
FIG. 6

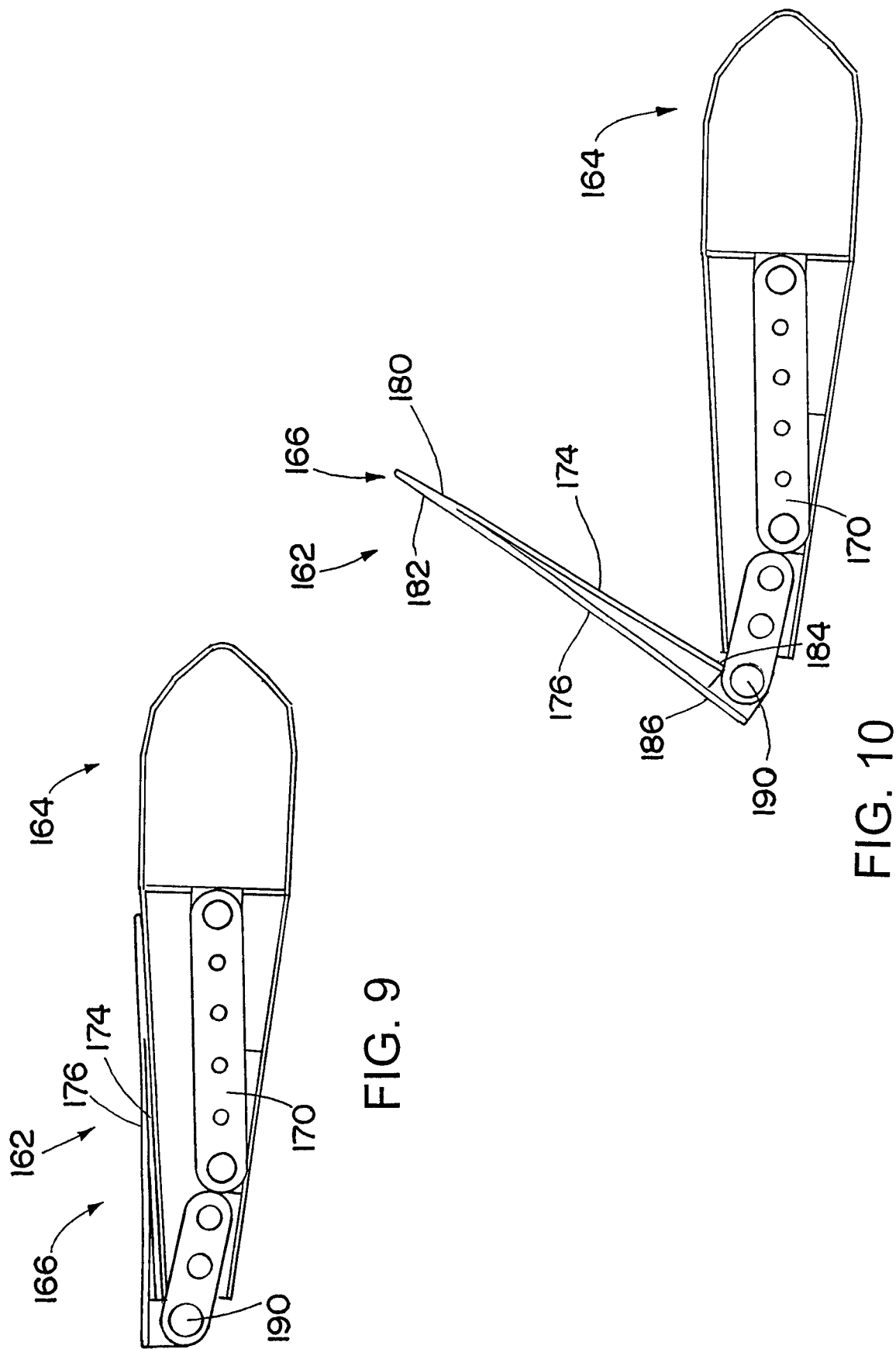

RECONFIGURABLE WING AND METHOD OF USE

BACKGROUND OF THE INVENTION

1. Technical Field of the Invention

The invention is in the field of air vehicle wings.

2. Description of the Related Art

Air vehicle wings have been produced in a wide variety of sizes and configurations, for a wide variety of air vehicle. There is a continuing desirability for improvements in the field of air vehicle wings.

SUMMARY OF THE INVENTION

It may be desirable to have stowed wings in certain types of air vehicle, such as air vehicle launched from tubes. It is desirable that stowed wings be compact in their stowed configuration, while still having good flight characteristics when deployed. In addition, it may be desirable to have wings that are able to have different configurations for different flight regimes, such as for a high-speed dash and a low-speed loiter. Reconfigurable wings that are able to increase chord from a compact configuration to an expanded configuration may satisfy one or both of these desirable characteristics.

According to an aspect of the invention, a reconfigurable wing may be moved from a compact configuration to an expanded configuration, to increase chord of the wing.

According to another aspect of the invention, a reconfigurable wing may be shifted between a relatively-small-chord compact configuration and a relatively-large-chord expanded configuration. Both of the configurations have aerodynamic shapes used for generating lift, such as for different flight regimes.

According yet another aspect of the invention, a reconfigurable wing includes a leading edge section and a trailing edge section which are hinged relative to each other to change chord of the wing.

According to still another aspect of the invention, a reconfigurable wing includes foam that forms a part of the external surface of the wing in at least one configuration. The foam may have a smooth material on its surface to provide a low-drag surface.

According to a further aspect of the invention, a reconfigurable wing may have a structural member, such as a box strut, that contains a centroid of aerodynamic forces on the wing and/or that supports substantially all of the aerodynamic forces on the wing.

According to a still further aspect of the invention, a reconfigurable wing includes: a leading edge section; and a trailing edge section hingedly coupled to the leading edge section. The trailing edge section may be moved relative to the leading edge section to increase the chord of the wing.

According to another aspect of the invention, a method of reconfiguring a wing includes: increasing chord of the wing by shifting the wing from a compact configuration to an expanded configuration, wherein the increasing chord includes: rotating a trailing edge section of the wing relative to a leading edge section of the wing, wherein the trailing edge section and the leading edge section are hingedly coupled together; and exposing a foam material of the wing as part of a surface of the expanded configuration.

According to still another aspect of the invention, a method of reconfiguring a wing includes: increasing chord of the wing by shifting the wing from a compact configuration to an expanded configuration, wherein the increasing chord includes: rotating a trailing edge section of the wing relative to a leading edge section of the wing, wherein the trailing edge section and the leading edge section are hingedly coupled together; and wherein the rotating the trailing edge section includes moving at least part of a first plate of the trailing edge section relative to at least part of a second plate of the trailing edge section.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 3 is a cross-sectional view of a second embodiment reconfigurable wing in accordance with the invention, with the wing in a compact state or configuration;

FIG. 4 is a cross-sectional view of the wing of FIG. 3, in an expanded state or configuration;

FIG. 5 is a cross-sectional view of a third embodiment reconfigurable wing in accordance with the invention, with the wing in a compact configuration;

FIG. 6 is a cross-sectional view of the wing of FIG. 5, in an expanded configuration;

FIG. 9 is an oblique cutaway view of a fifth embodiment reconfigurable wing in accordance with the invention, with the wing in a compact configuration;

FIG. 10 shows another view of the wing of FIG. 9, in an early step in the transition between the compact configuration and an expanded configuration;

DETAILED DESCRIPTION

A reconfigurable air vehicle wing may be selectively reconfigured to increase its chord. The wing has a leading edge portion and a trailing edge portion that are moved relative to one another to change the chord of the wing. The wing may be reconfigured from a compact configuration with a smaller chord, to an expanded configuration with a larger chord. The wing may include a foam material that forms part of the outer surface of the wing when the wing is in the expanded configuration. The foam may be a shape memory foam. Alternatively the leading edge section and the trailing edge section may be composed substantially fully of rigid materials. In either case the trailing edge section may be hingedly coupled to the leading edge section, enabling the trailing edge section to pivot relative to the leading edge section in order to move the wing between the compact configuration and the expanded configuration.

Increasing the chord of the wing may be done as part of a process of deployment of the wing upon launch of an air vehicle that the wing is part of. In such a process the reconfigurable wing may be transformed from a non-airfoil shape to an airfoil shape. Alternatively, both the compact and expanded configurations may be lift-producing airfoil configurations.

Figure 1:
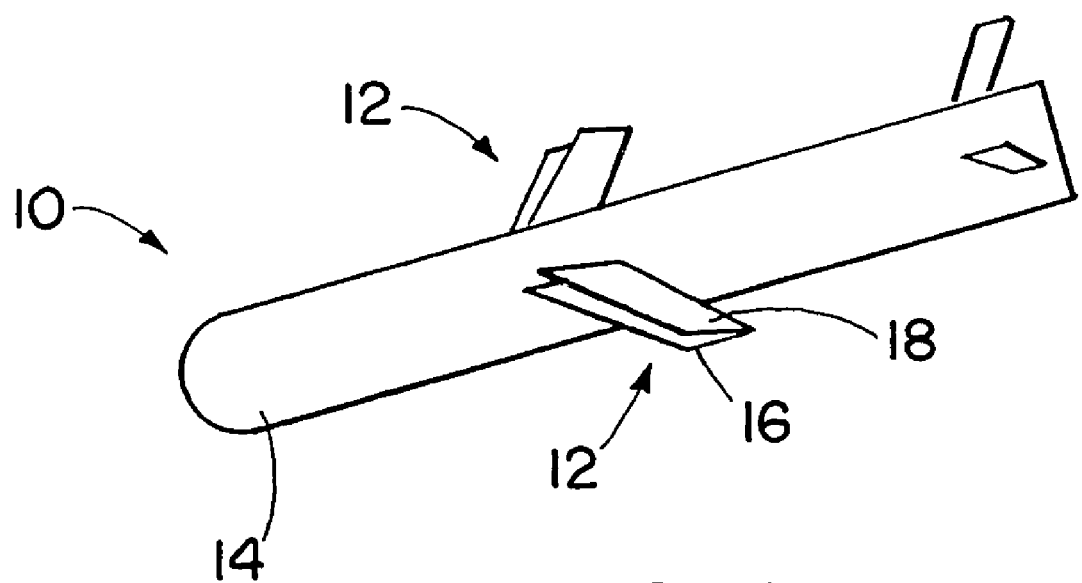
FIG. 1 is an oblique view of an air vehicle having a reconfigurable wing in accordance with an embodiment of the invention, with the wing in a compact configuration.
Figure 2:
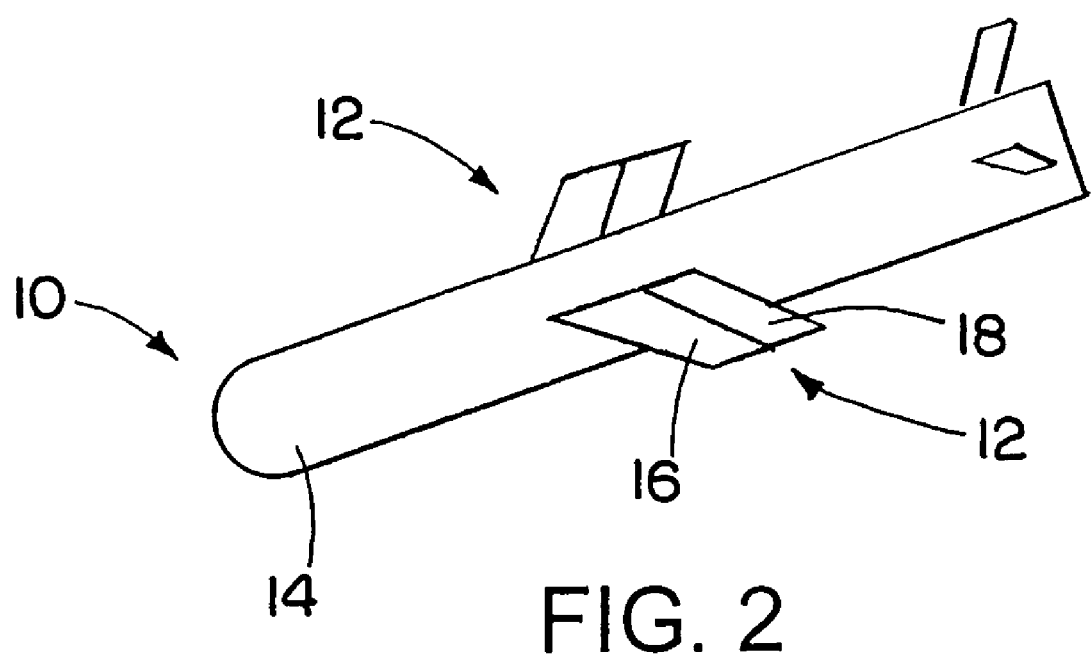
FIG. 2 is an oblique view of the air vehicle of FIG. 1, with the wing in an expanded configuration.

Referring initially to FIGS. 1 and 2, an air vehicle 10 has a pair of reconfigurable wings 12 coupled to a fuselage 14. The wings 12 may be automatically or selectively reconfigured from a compact configuration (FIG. 1) in which the wings 12 have a smaller chord, to an expanded configuration (FIG. 2) in which the wings have a larger chord. The wings 12 each have a leading edge section or portion 16 and a trailing edge section or portion 18. In the expanded configuration the leading edge section 16 is forward on the wing, ahead of the aft trailing edge section 18. The transformation of the wing 12 from the compact configuration to the expanded configuration may involve movement of the trailing edge section 18 relative to the leading edge section 16.

Many variations on the configuration and operation of the reconfigurable wing 12 are discussed in detail below. It will be appreciated that the embodiments discussed below are only some of many possible embodiments for the reconfigurable wing 12. The reconfigurable wing 12 may be reconfigured as part of a deployment process of the wings 12 from the fuselage 14. The deployment may occur upon launch of the air vehicle 10. The wings may deploy by extending them out from the fuselage, such as from slots in the fuselage or from locations adjoining the fuselage. The chord-increasing reconfiguration of the wings 12 may be done before, after, or during the extension of the wings into the airflow (increasing the effective span of the wings).

Alternatively, as discussed below, the reconfigurable wings 12 may have air foil shapes in both the compact (small chord) configuration and the extended (large chord) configuration. The ability to fly the air vehicle 10 with the reconfigurable wings 12 in either of the possible configurations allows reconfiguring of the wings 12 to provide different flight characteristics for different flight situations.

The air vehicle 10 may be any of a wide variety of different types of air vehicle, including manned or unmanned aerial vehicles, or powered missiles or unpowered projectiles. The air vehicle 10 may have any of a wide variety of different sizes. For example aerial vehicle may be a small vehicle having a weight as low as 5 pounds.

The aerial vehicle 10 may be deployed by being launched from a launch tube or other container. It will be appreciated that the vehicle may have to have a certain shape (such as cylindrical) while still in the launch tube or other container, necessitating the use of deployable wings that are stowed during launch.

Many configurations for the reconfigurable wings 12 are possible, only some of which are discussed below. Some of the configurations discussed below use compressible foam for parts of the reconfigurable wings 12. The foam may be placed at various locations in the wings 12, forming parts of the outside surfaces of the wings 12.

Other embodiments discussed below do not utilize compressible foam. Rather they involve rigid materials that are moved relative to one another to change the configuration of the reconfigurable wings 12.

FIGS. 3 and 4 show a reconfigurable wing 22, one embodiment of the reconfigurable wing 12. The wing 22 includes a leading edge section or portion 24, a trailing edge section or portion 26, and a compressible foam material 28. The leading edge portion 24 and the trailing edge portion 26 are both made of substantially rigid materials, for example being made of aluminum or composite materials. The leading edge portion 24 and the trailing edge portion 26 are hingedly coupled together at a hinge 30. The leading edge portion 24 may have a solid forward part 32 that includes a solid nose or tip 34 at the front of the wing 22. In the closed configuration, shown in FIG. 3, the trailing edge portion 26 is folded over so that it overlaps the leading edge portion 24. The foam 28 is between the leading edge portion 24 and the trailing edge portion 26. In the compact configuration shown in FIG. 3 the foam 28 is sandwiched between the trailing edge portion 26 and the leading edge portion 24. In the compact configuration the rigid leading edge portion 24 and trailing edge portion 26 together constitute substantially all of the exposed outer surface of the wing 22. Rotating the trailing edge portion 26 relative to the leading edge portion 24 to open up the reconfigurable wing 22 into the extended position (FIG. 4) expands the foam 28 to fill a bottom portion 38 of the reconfigurable wing 22. The foam 28 provides most of a bottom surface 40 of the wing 22, when the wing 22 is in the extended configuration. The solid or at least rigid leading edge portion 24 and trailing edge portion 26 constitute all or substantially all of the top aerodynamic surface 42 of a top portion 44 of the wing 22 (when the wing 22 is in the extended configuration shown in FIG. 4).

The foam 28 may be any of a wide variety of flexible foam materials. One broad class of flexible foams is polymer foams. The foam 28 may be a shape memory polymer foam. Shape memory foams have an advantage in that they may be stored for a long time without becoming fixed into their stored shape. The shape memory polymer foam or other type of foam may be set into the shape shown in the expanded configuration of FIG. 4. This means that the shape shown in FIG. 4 may be fixed in the "memory" of the shape memory foam, to be returned to by the foam when a deforming force (such as a force retaining the wing 22 in its compact configuration) is removed. The foam 28 may have a tendency to spring back to its shape shown in FIG. 4 after a mechanical restraint holding the wing 22 in the closed or compact position is released. Thus the foam 28 may provide force that urges reconfiguration of the wing 22 from the compact configuration to the extended configuration. A shape memory polymer foam may be thermally activated in order to produce the force that aids in reconfiguring the wing 22 from the compact configuration to the extended configuration.

The foam 28 may have other characteristics, such as being either an open cell foam or alternatively a syntactic foam that has hollow particles (microballoons) mixed in with the continuous material of the foam. An open cell or syntactic foam may have smaller cells or particles near its surface. Alternatively or in addition the foam 28 may have surface skin material that provides a smooth external surface to the foam 28.

FIGS. 5 and 6 show another reconfigurable wing configuration, a wing 62 that includes a trailing edge section or portion 66 that is hingedly coupled to a leading edge section or portion 64. The trailing edge portion 66 includes a pair of solid-material plates 70 and 72. The plates 70 and 72 are attached together at respective first ends 74 and 76. The first plate 70 is hingedly coupled to the leading edge portion 64, with a second end 78 of the first plate 70 coupled to the leading edge portion 64 at a hinge or hinge point 80. The hinge 80 may be any of a variety of suitable mechanical hinges.

The trailing edge portion 66 rotates about the hinge 80, relative to the leading edge portion 64, to put the wing 62 in the extended configuration shown in FIG. 6. This rotation may be driven by pressure forces once the wing 62 is exposed to an airstream when in its compact configuration. Alternatively other actuation mechanisms, such as springs or other force-producing mechanisms, may be used to rotate the trailing edge portion 66 relative to the leading edge portion 64. As the trailing edge portion 66 rotates about the hinge 80, a second end 82 of the second plate 72, initially a free end, comes into contact with a cam surface 86 along the back or aft part of the leading edge portion 64. This cam surface 86 urges the first ends 78 and 80 of the plates 70 and 72 apart. As the trailing edge portion 66 continues to rotate the second end 82 settles in a notch 90 in the bottom of the leading edge portion 64. There a mechanical latch 94 may be used to secure the second end 82 to the leading edge section 64. The mechanical latch 94 may be any of a variety of types of latches including various known mechanical or magnetic elements.

The leading edge portion 64 may include a leading edge section body 98 and a nose portion 100. The leading edge section body 98 may be a solid piece made of suitable rigid material, for example metal or a polymer matrix material. The nose portion 100 may be made of the same or a similar rigid material. Alternatively, the nose portion 100 may be made of a flexible material, such as a polymer foam.

The wing 62 may have the advantage of being able to automatically reconfigure itself from the compact configuration (FIG. 5) to the extended configuration (FIG. 6) when deployed into an airstream. This may be used to automatically reconfigure the wing 62 to the extended configuration upon launch of a missile or other aerial vehicle.

Figure 7:
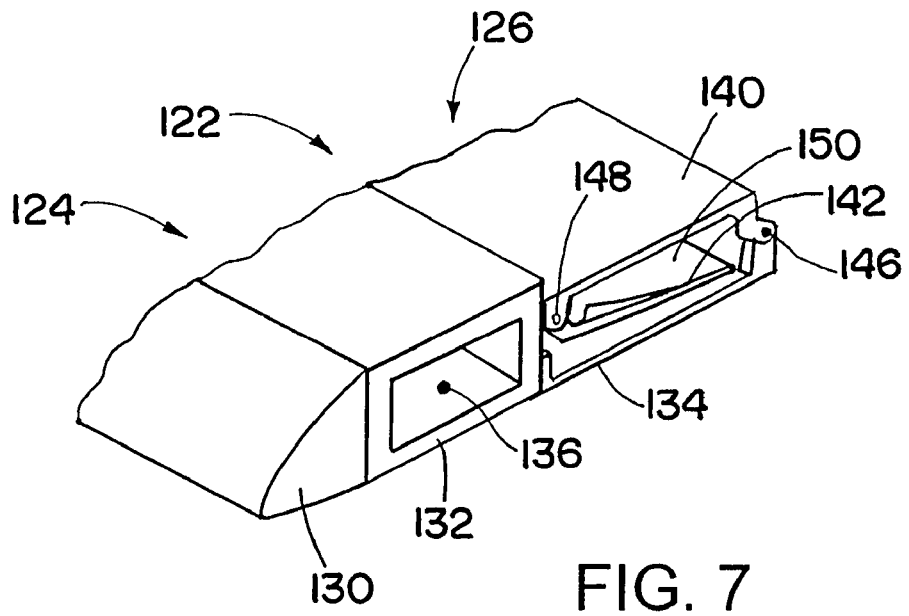
FIG. 7 is an oblique cutaway view of a fourth embodiment reconfigurable wing in accordance with the invention, with the wing in a compact configuration.
Figure 8:
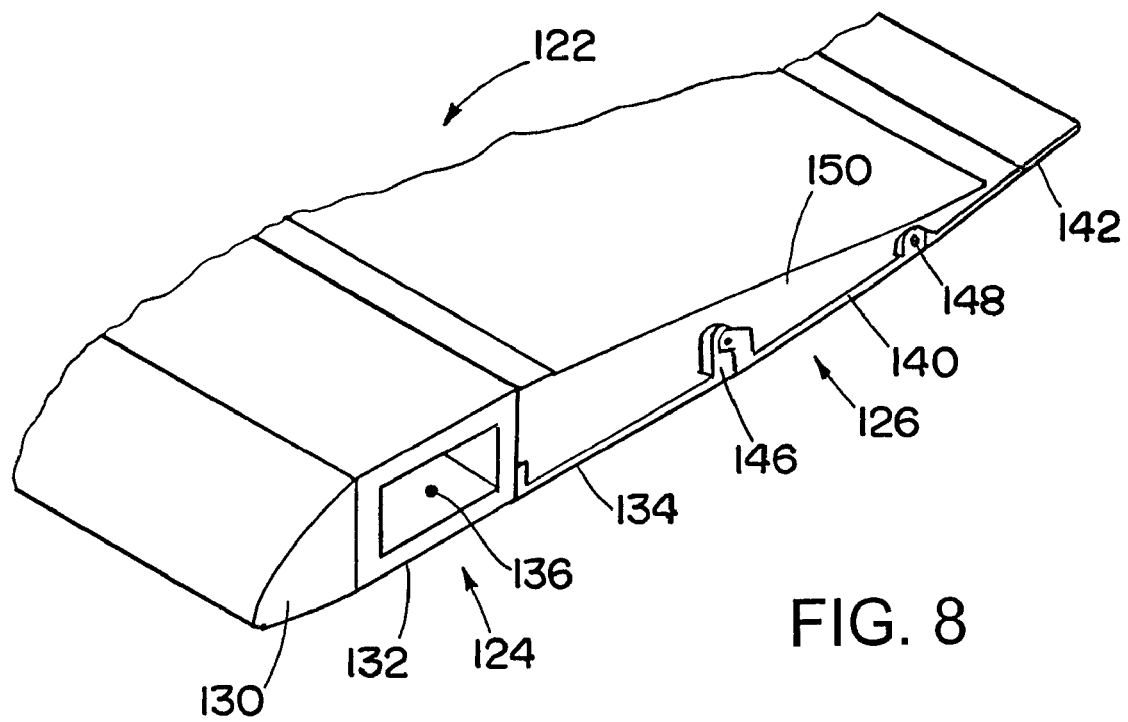
FIG. 8 is a cutaway view of the wing of FIG. 7 in an expanded configuration.
Figure 11:
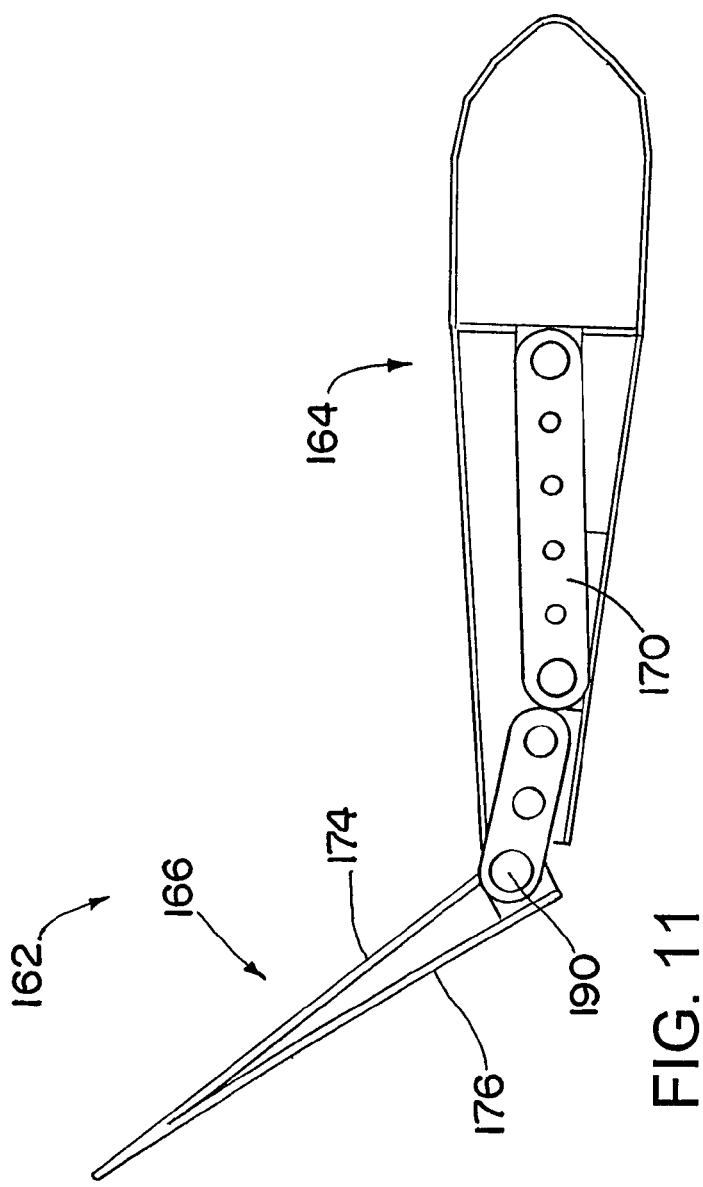
FIG. 11 is still another view of the wing of FIG. 9, further along the transition to the expanded configuration.
Figure 12:
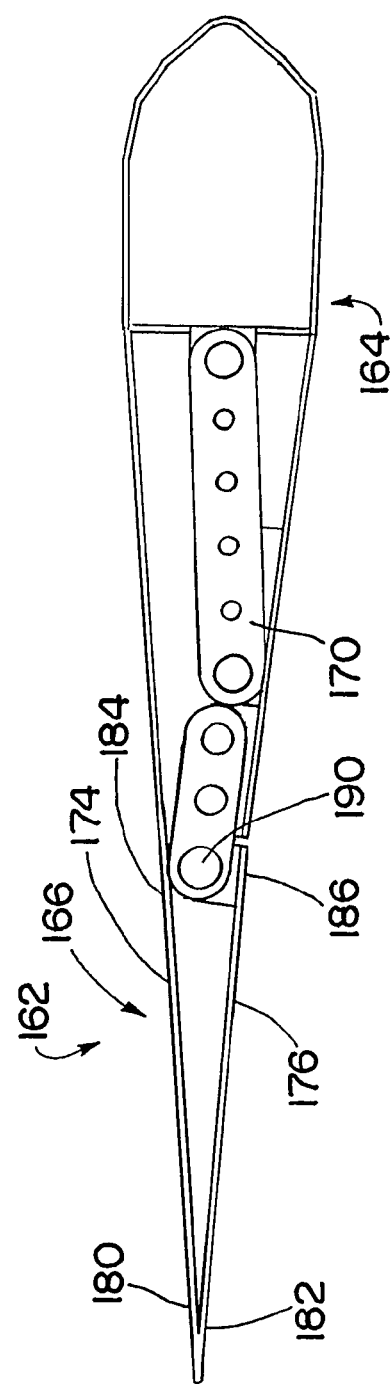
FIG. 12 is a view of the wing of FIG. 9 in the expanded configuration.

FIGS. 7 and 8 show a reconfigurable wing 122 that has a leading edge portion or section 124, and a trailing edge portion or section 126 that has multiple folding sections. The leading edge section 124 includes a nose portion 130 at the forward end of the section 124, a central rigid structure such as a shear box 132, and an aft portion 134 that is attached to the shear box 132. The nose portion 130 may be made of a foam material such as a shape memory foam. The shear box 132 may be configured to handle substantially all of the flight loads on the reconfigurable wing 122. The shear box may be an extruded aluminum channel or other rigid structure. The shear box or other structure 132 may be placed at or around a centroid 136 of the wing 122, which is a location which is the center of the aerodynamic pressure loads on the wing 122.

The trailing edge section 126 has a pair of rigid structural members 140 and 142. The forward structural member 140 is hingedly coupled to the aft portion 134 of the leading edge section 124 at a hinge 146. An additional hinge 148 allows relative rotation between the structural portions 140 and 142.

A polymer or other material foam 150 overlies at least parts of the structural portions 134, 140 and 142. The foam 150 may be a shape memory polymer foam. The wing 122 may be folded up along the hinges 146 and 148 to produce the compact configuration shown in FIG. 7. The wing 122 may be reconfigured from this compact configuration to the expanded configuration shown in FIG. 8. In the compact configuration the structure aft of the shear box 132 is a "sandwich" of alternate layers of rigid structural material and foam. The wing unfolds to the expanded configuration of FIG. 8, with the foam 150 possibly providing force to accomplish the reconfiguring of the wing 122. The polymer foam fills a portion of the aerodynamic surface of the expanded wing configuration.

The wing 122 is in some ways similar to the wing 22 (FIGS. 3 and 4) that was discussed above. However, the wing 22 has some additional advantages. The shear box 132 provides a strong structural member that is able to bear substantially all of the aerodynamic loads of the wing 122. By placing the shear box 132 such that the centroid 136 of the aerodynamic forces on the wing 122 is within the shear box 132, structural loads can be handled in a minimum of space.

Another advantage is the amount of expansion of chord length that may be accomplished between the compact configuration of the wing 122 and the expanded configuration of the wing 22. Although the nose portion 130 is shown as expanded in FIG. 7, it will be appreciated that the foam nose portion 130 may be compressed during storage of the wing 122. The expansion of this nose portion 130, combined with folding out of the multiple parts 140 and 142 of the trailing edge section 126, allows the wing 122 to increase its chord length by a factor of 2 or more.

FIGS. 9-12 show a wing 162 that is reconfigurable, with both of the configurations providing aerodynamic surfaces usable for providing lift to the air vehicle. A leading edge section or portion 164 has a linkage 170 in it for use in repositioning a trailing edge section or portion 166 relative to the leading edge section 164. The trailing edge section 166 includes an upper plate 174 and a lower plate 176. The linkage 170 allows both of the plates 174 and 176 to move relative to the leading edge section 164. The plates 174 and 176 are attached together at respective first ends 180 and 182. At respective second ends 184 and 186 the plates 174 and 176 are coupled to the linkage 170. As shown in the progression from the compact configuration, shown in FIG. 9 to the expanded configuration, shown in FIG. 12, the plate second ends 184 and 186 increasingly separate from one another as the trailing edge section 166 is rotated about a hinge point 190 of the linkage 170.

The wing 162 may still be usable as a lift-producing wing even when in the compact configuration shown in FIG. 9. The wing 162 may be selectively moved between the compact configuration and the expanded configuration. The different configurations shown in FIGS. 9 and 12 may be used for different flight regimes. For example, the expanded configuration, with its larger chord, may be used for low speed flight, and the relatively small chord compact configuration shown in FIG. 9 may be used for higher speed flight. The large-chord expanded configuration may be used for loitering flight, for instance.

Figure 13:
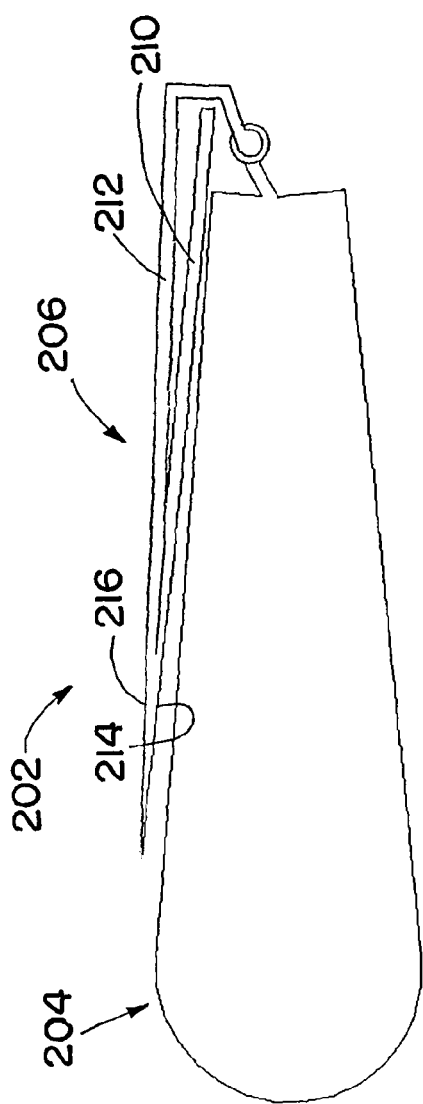
FIG. 13 is a cross-sectional view of a sixth embodiment reconfigurable wing in accordance with the invention, with the wing in a compact configuration.
Figure 14:
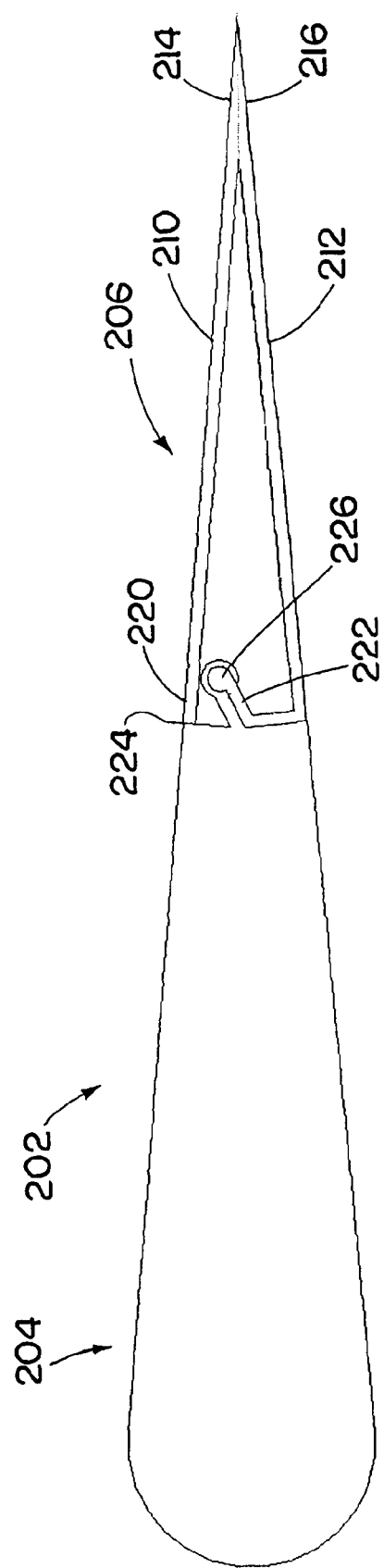
FIG. 14 is a cross-sectional view of the wing of FIG. 13 in an expanded configuration.

FIGS. 13 and 14 show another reconfigurable wing that is capable of operating to provide lift in both the compact and expanded configurations. A wing 202 includes a leading edge section or portion 204 that may be made of a rigid material, and may be a substantially continuous solid body. A trailing edge section or portion 206 includes an upper plate 210 and a lower plate 212. The plates 210 and 212 are mechanically coupled together at respective first ends 214 and 216, although the first ends 214 and 216 are configured to be able to slide relative to one another, as discussed in further detail below. The second ends 220 and 222 of the plates 210 and 212 are hingedly coupled to the leading edge section 204 at respective hinge points 224 and 226. The lower plate second end 222 is angled upward and aftward to reach the hinge point 226, which is aft of the rest of the leading edge section 204. The hinge point 226 is aft of the hinge point 224, and is aft of portions or parts of both the upper plate 210 and the lower plate 212. The hinge point 226 may be above a midpoint between the planar portions of the upper plate 210 and the lower plate 212, when the wing 202 is in the expanded configuration. The hinge point 226 may also be between a midline bisecting the cross-section of the leading edge section 204.

The wing 202 may be transformed from a compact configuration shown in FIG. 13 to an expanded configuration shown in FIG. 14. This transformation involves pivoting the upper plate 210 about the hinge point 220, as well as pivoting the lower plate 212 about the hinge point 226. The plates 210 and 212 are close together when the wing 202 is in the compact configuration, but spread apart as the wing 202 is transformed into the expanded configuration.

Figure 15:
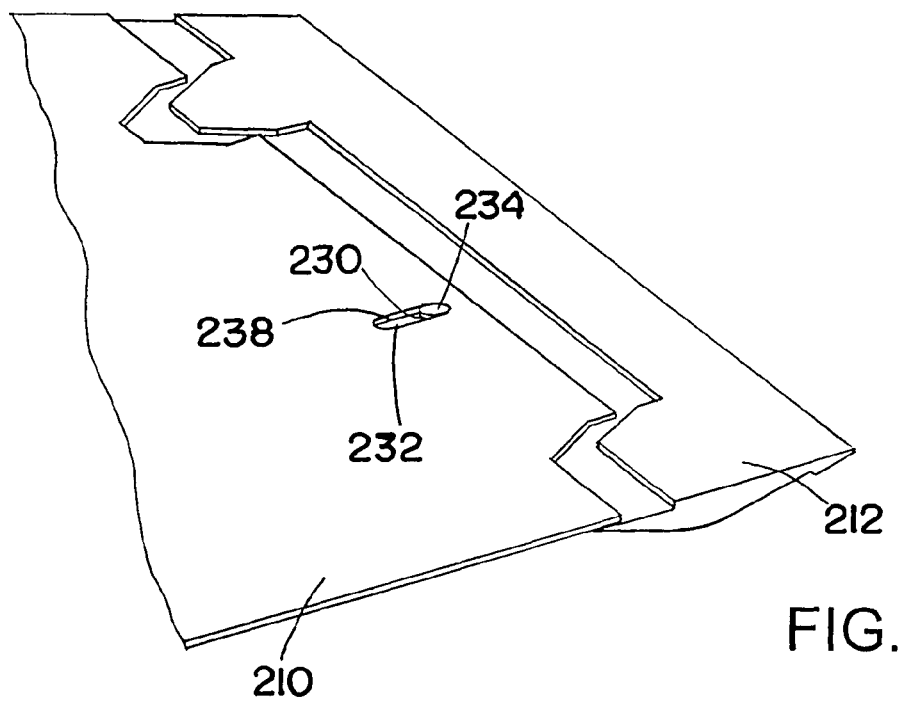
FIG. 15 is an oblique view showing a slidable mechanical connection between plates of the wing of FIG. 13, with the plates in a first relative position.
Figure 16:
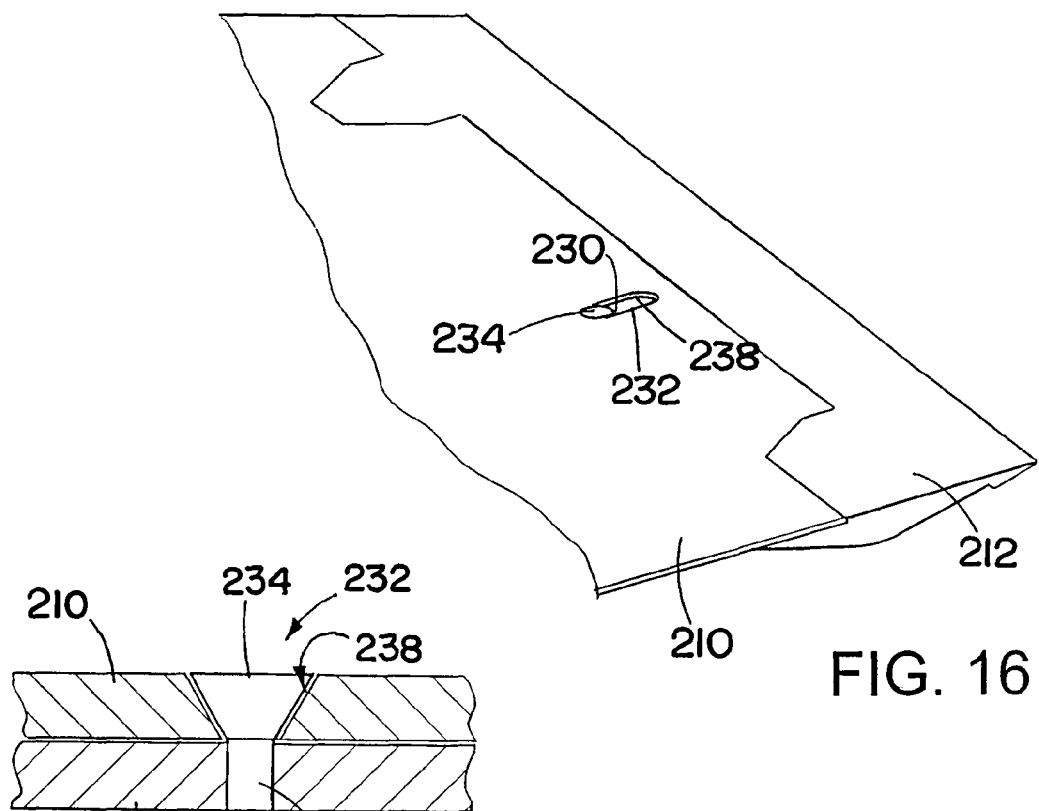
FIG. 16 is an oblique view showing the slidable mechanical connection between plates of the wing of FIG. 13, with the plates in a second relative position.
Figure 17:
FIG. 17 is a cross-sectional view showing a portion of the wing of FIG. 13.

In moving the wing 202 from the compact configuration to the expanded configuration the first ends 214 and 216 of the plates 210 and 212 slide relative to one another. FIGS. 15-17 illustrate the mechanism utilized for mechanically coupling the first ends 214 and 216 together, while still allowing relative sliding between them. The lower plate 216 has a series of pins 230 protruding out of it. The protruding pins 230 engage respective elongate slots 232 in the first upper plate end 214. The pins 230 have angled heads 234 that are wider at their distal ends than at their proximal ends. The elongate slots 232 have correspondingly-shaped chamfered or sloped edges 238. The pins 230 engage the slots 232 to prevent the ends 214 and 216 of the plates 210 and 212 from becoming separated from one another. The pins 230 are able to move to some degree within the length of the slots 232, allowing the ends 214 and 216 to slide relative to one another. FIGS. 15 and 16 show this sliding, with the plate ends 214 and 216 in a relatively different position between the two figures.

The various reconfigurable wings disclosed herein advantageously are able to be stored in less space, due to the folded chord in the compact configuration. The transition from the compact configuration to the expanded configuration may increase the chord by a factor of two or more. The use of foam in the wings may allow for a lightweight wing that is still able to obtain the desired expanded configuration even after long periods of storage, such as for several years. The foam may be a shape memory foam, which is able to resist becoming set in a shape it is forced into. The wings may be deployed from the compact configuration to the expanded configuration using forces from the compressed foam and/or using aerodynamic forces as the wings are introduced into an airstream.

Some of the embodiments disclosed herein have the further advantage of being able to provide aerodynamic surfaces for generating lift in both the compact configuration and the expanded configuration. The different configuration may be used for different flight regimes, such as for different airspeeds and/or different altitudes.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A reconfigurable wing comprising:
a leading edge section; and
a trailing edge section hingedly coupled to the leading edge section;
wherein the trailing edge section may be moved relative to the leading edge section to increase the chord of the wing;
wherein the trailing edge section includes an upper plate and a lower plate; and
wherein when the trailing edge section is moved relative to the leading edge section to increase the chord of the wing, the upper plate is along a top surface of the wing, and the lower plate is along the lower surface of the wing.

2. The reconfigurable wing of claim 1, wherein the moving the trailing edge section relative to the leading edge section transforms the wing from a compact configuration to an extended configuration.

3. The reconfigurable wing of claim 2, wherein the compact configuration is a stowed configuration that does not have an airfoil shape, and the extended configuration is a deployed configuration that has an airfoil shape.

4. The reconfigurable wing of claim 1, wherein the leading edge section and the trailing edge section are both made of rigid material.

5. A reconfigurable wing comprising:
a leading edge section; and
a trailing edge section hingedly coupled to the leading edge section;
wherein the trailing edge section may be moved relative to the leading edge section to increase the chord of the wing;
wherein the moving the trailing edge section relative to the leading edge section transforms the wing from a compact configuration to an extended configuration; and
wherein both of the configurations have respective different airfoil shapes.

6. A reconfigurable wing comprising:
a leading edge section; and
a trailing edge section hingedly coupled to the leading edge section;
wherein the trailing edge section may be moved relative to the leading edge section to increase the chord of the wing;
wherein the leading edge section and the trailing edge section are both made of rigid material; and
wherein the trailing edge section includes a pair of plates that are mechanically coupled together at first ends, and are unattached at a second end.

7. The reconfigurable wing of claim 6,
wherein the plates include a first plate and a second plate;
wherein the second end of the first plate is hingedly coupled to the leading edge section; and wherein the second end of the second plate is directly mechanically coupled to leading edge section only when the wing is in the extended configuration.

8. The reconfigurable wing of claim 7, wherein the second end of the second plate is latched to the leading edge when the wing is in the extended configuration.

9. A reconfigurable wing comprising:
a leading edge section; and
a trailing edge section hingedly coupled to the leading edge section;
wherein the trailing edge section may be moved relative to the leading edge section to increase the chord of the wing; and
wherein the leading edge section includes a shear box.

10. The reconfigurable wing of claim 9, further comprising a foam material providing part of an external surface of the wing when the wing is in the extended configuration.

11. The reconfigurable wing of claim 10, wherein the foam material is a polymer foam.

12. The reconfigurable wing of claim 11, wherein the polymer foam is a shape memory polymer foam.

13. The reconfigurable wing of claim 11, wherein the polymer foam is an open-cell polymer foam.

14. The reconfigurable wing of claim 11, wherein the polymer foam is a syntactic polymer foam.

15. The reconfigurable wing of claim 11, wherein the polymer foam is compressed in the compact configuration, and provides a force to transform the wing to the extended configuration.

16. The reconfigurable wing of claim 9, wherein the leading edge section also includes a foam part in front of the shear box, wherein the foam part includes the leading edge of the wing.

17. The reconfigurable wing of claim 9, wherein a centroid of aerodynamic load forces on the wing is located within the shear box.

18. The reconfigurable wing of claim 9, wherein the shear box is a rectangular cross section shear box.

19. A method of reconfiguring a wing, the method comprising:
increasing chord of the wing by shifting the wing from a compact configuration to an expanded configuration, wherein the increasing chord includes:
rotating a trailing edge section of the wing relative to a leading edge section of the wing, wherein the trailing edge section and the leading edge section are hingedly coupled together; and
wherein the rotating the trailing edge section includes moving at least part of a first plate of the trailing edge section relative to at least part of a second plate of the trailing edge section; and
wherein, after the rotating, the first plate is part of an upper surface of the wing, and the second plate is part of a lower surface of the wing.

* * * * *